(12) United States Patent
Xue et al.

(10) Patent No.: US 12,339,416 B1
(45) Date of Patent: Jun. 24, 2025

(54) SHORT-OFFSET TRANSIENT ELECTROMAGNETIC TRANSMISSION SYSTEM

(71) Applicant: Institute of Geology and Geophysics, Chinese Academy of Sciences (IGGCAS)., Beijing (CN)

(72) Inventors: Guoqiang Xue, Beijing (CN); Qihui Zhen, Beijing (CN); Xin Wu, Beijing (CN)

(73) Assignee: Institute of Geology and Geophysics, Chinese Academy of Sciences (IGGCAS), Beijing (CN)

( * ) Notice: Subject to any disclaimer, the term of this patent is extended or adjusted under 35 U.S.C. 154(b) by 0 days.

(21) Appl. No.: 19/087,466

(22) Filed: Mar. 22, 2025

(30) Foreign Application Priority Data

Jan. 16, 2025 (CN) .......................... 202510067990.9

(51) Int. Cl.
*G01V 3/08* (2006.01)
*G01S 13/02* (2006.01)
(Continued)

(52) U.S. Cl.
CPC ................ *G01V 3/08* (2013.01); *G01V 3/083* (2013.01); *G01V 3/12* (2013.01); *G01V 3/28* (2013.01);
(Continued)

(58) Field of Classification Search
CPC . G01V 3/08; G01V 3/12; G01V 3/083; G01V 3/28; G01V 3/30; G01S 13/885; G01S 13/88; G01S 13/0209; G01S 13/86
(Continued)

(56) References Cited

U.S. PATENT DOCUMENTS

| 2008/0265896 A1* | 10/2008 | Strack | G01V 3/12 324/350 |
| 2010/0013486 A1* | 1/2010 | Ziolkowski | G01V 3/083 324/337 |
| 2010/0201367 A1* | 8/2010 | Ziolkowski | G01V 3/083 324/334 |

FOREIGN PATENT DOCUMENTS

| CN | 105911597 A | 8/2016 |
| CN | 118432443 A | 8/2024 |

OTHER PUBLICATIONS

Xue Guoqiang et al., "Research on Short-Offset Transient Electromagnetic Detection System", Chinese Journal of Geophysics, Aug. 25, 2023, pp. 3514-3523, vol. 66, No. 8.
(Continued)

*Primary Examiner* — Raul J Rios Russo
(74) *Attorney, Agent, or Firm* — Hemisphere Law, PLLC; Zhigang Ma

(57) ABSTRACT

A short-offset transient electromagnetic transmission system, including: an electromagnetic transmitter with transmission power supplies P1, P2, P3, P4, grounding electrodes A, B, C, D, F, and transmission wires LA, LB1, LB2, LC1, LC2, LD1, LD2, LE. The electrodes A and B are connected to the transmission power supply P1 via the wires LA and LB1. The electrodes B and C are connected to the transmission power supply P2 via the wires LB2 and LC1. The electrodes C and D are connected to the transmission power supply P3 via the wires LC2 and LD1. The electrodes D and E are connected to the transmission power supply P4 via the wires LD2 and LE. The wires LA and LB1 are pulled from the electromagnetic transmitter to the electrode B and the wires LD2 and LE are pulled from the electromagnetic transmitter to the electrode D in a twisted-pair manner.

1 Claim, 4 Drawing Sheets

(51) Int. Cl.
  *G01S 13/86*   (2006.01)
  *G01S 13/88*   (2006.01)
  *G01V 3/12*    (2006.01)
  *G01V 3/28*    (2006.01)
  *G01V 3/30*    (2006.01)

(52) U.S. Cl.
  CPC ............ *G01V 3/30* (2013.01); *G01S 13/0209* (2013.01); *G01S 13/86* (2013.01); *G01S 13/88* (2013.01); *G01S 13/885* (2013.01)

(58) Field of Classification Search
  USPC ........................................................ 324/332
  See application file for complete search history.

(56) References Cited

OTHER PUBLICATIONS

CNIPA, Notification of a First Office Action for CN202510067990.9, Feb. 20, 2025.
Institute of Geology and Geophysics, Chinese Academy of Sciences (Applicant), Replacement claims (allowed) of CN202510067990.9, Mar. 7, 2025.
CNIPA, Notification to grant patent right for invention in CN202510067990.9, Mar. 17, 2025.

* cited by examiner

SHORT-OFFSET TRANSIENT ELECTROMAGNETIC TRANSMISSION SYSTEM

TECHNICAL FIELD

The disclosure relates to the field of geophysical exploration technologies, and more particularly to a short-offset transient electromagnetic transmission system.

BACKGROUND

Artificial source electromagnetic method (also referred to as controlled-source electromagnetic, abbreviated as CSEM) is one of mainstream methods for mineral resource exploration, which uses grounded wires or closed loops as antennas to excite the ground and extracts information about underground electrical structures by observing the ground response signals. According to the distance between the observation area and the transmission source, it can be generally divided into far-source methods and near-source methods. For a long time, far-source methods (such as controlled source audio-frequency magnetotellurics abbreviated as CSAMT, long offset transient electromagnetic method abbreviated as LOTEM, etc.) have become the mainstream of artificial source electromagnetic methods due to their relatively simple solutions and have been widely promoted worldwide. In near-source observation, although the signal is stronger and the bandwidth is larger, which is more conducive to achieving large-depth and high-precision detection, the wave field conditions in the near-source area are complex, so the development of near-source methods has been relatively lagging. Since 2000, researchers at the University of Edinburgh in the United Kingdom have proposed the near-source method, multi-transient electromagnetic (MTEM) mothed, which is based on multi-channel arrays, achieving fine identification of subsurface geological structures (also referred to as underground structures). Since then, the study of the near-source method has gradually become a research hotspot worldwide. Since 2013, the short-offset transient electromagnetic (SOTEM) method has been proposed, which has the advantages of large detection depth and strong resolution.

Currently, in actual SOTEM observations, although existing electromagnetic equipment can stably obtain data, the actual detection effect cannot meet expectations, indicating that the equipment is not well adapted to the method. From the perspective of equipment, in traditional far-source methods, the transmission and reception distances are large, and the signal amplitude and bandwidth are significantly attenuated. Equipment matching far-source methods mainly considers achieving large-depth detection by increasing transmission power and suppressing sensor noise levels. However, because the signal itself has a limited bandwidth (about 10 kilohertz abbreviated as kHz) under far-source observation conditions, the equipment also only considers a smaller bandwidth in the entire process, that is, existing equipment mainly achieves high-power transmission and low-noise observation under narrow bandwidth conditions. In actual work, existing electromagnetic transmitters have weak adaptability to the SOTEM method, mainly reflected in the bandwidth of the transmission current being smaller than the bandwidth required by the SOTEM method.

In addition, the transmitter of SOTEM typically has a long transmission distance of up to 1 kilometer (km), with wire inductance reaching as high as 2.5-3 millihenries (mH). The characteristic of inductive current lagging behind inductive voltage severely limits the bandwidth of the transmission current. To achieve high-bandwidth current transmission, constant voltage clamping technology is generally used to accelerate the switching speed of the current. Currently, the mainstream electromagnetic equipment on the market usually adopts an active constant voltage clamping scheme, with a clamping voltage of generally 1000 volts (V). To achieve faster switching of the transmission current, it is necessary to increase the clamping voltage. However, the voltage withstand characteristics of power devices limit further increases in voltage, while also posing safety risks.

SUMMARY

Technical problem to be solved by the disclosure is to provide a short-offset transient electromagnetic transmission system.

To achieve the above purpose, the disclosure adopts the following technical solutions.

Specifically, a short-offset transient electromagnetic transmission system, including: an electromagnetic transmitter with four transmission power supplies P1, P2, P3, P4, five sets of grounding electrodes A, B, C, D, F, and eight transmission wires LA, LB1, LB2, LC1, LC2, LD1, LD2, LE. The grounding electrode A and the grounding electrode B are connected to the transmission power supply P1 via the transmission wire LA and the transmission wire LB1. The grounding electrode B and the grounding electrode C are connected to the transmission power supply P2 via the transmission wire LB2 and the transmission wire LC1. The grounding electrode C and the grounding electrode D are connected to the transmission power supply P3 via the transmission wire LC2 and the transmission wire LD1. The grounding electrode D and the grounding electrode E are connected to the transmission power supply P4 via the transmission wire LD2 and the transmission wire LE. The transmission wire LA and the transmission wire LB1 are pulled from the electromagnetic transmitter to a position of the grounding electrode B in a twisted-pair manner, and the transmission wire LD2 and the transmission wire LE are pulled from the electromagnetic transmitter to a position of the grounding electrode D in the twisted-pair manner.

In an embodiment, the electromagnetic transmitter includes: a diesel generator, a three-phase rectifier, an inverter isolation power supply, a constant current voltage regulator, and an output inverter. The diesel generator is configured (i.e., structured and arranged) to provide 380 volts (V) three-phase alternating current. The three-phase rectifier is configured to convert the three-phase alternating current into 540 V direct current. The inverter isolation power supply is configured to acquire four sets of 1000 V isolated power supplies through an inverter bridge, four transformers, four high-frequency rectifier bridges, and an inductor-capacitor (LC) filter. The constant current voltage regulator is configured to control an output voltage to achieve constant current regulation. The output inverter is configured to generate the four output transmission power supplies P1, P2, P3, P4.

In an embodiment, the output inverter adopts a bootstrap high-voltage clamping technique.

In an embodiment, the four transmission power supplies P1, P2, P3, P4 are relatively independent, and according to an output load, duty cycle signals are dynamically adjusted by controlling switching devices Q1-Q4 to maintain the output current constant.

The disclosure divides the 1 km long electrode distance into four short electrode distances using five sets of grounding electrodes, and uses eight twisted wires to connect the grounding electrodes to four sets of output power supplies (i.e., four transmission power supplies), designing a bootstrap ultra-high voltage clamping technology to further accelerate the switching speed of the current. By adopting the technical solutions of the disclosure, the electromagnetic transmission system is effectively adapted to the SOTEM method, while achieving rapid switching of transmission current under high power conditions.

BRIEF DESCRIPTION OF DRAWINGS

To more clearly illustrate the embodiments of the disclosure or the technical solutions in the related art, the following will briefly introduce the drawings needed in the description of the embodiments or the related art. Apparently, the drawings in the following description are only some embodiments of the disclosure. For those skilled in the art, other drawings can be obtained based on these drawings without creative effort.

DETAILED DESCRIPTION OF EMBODIMENTS

The following will clearly and completely describe the technical solutions in the embodiments of the disclosure with reference to the accompanying drawings. Apparently, the described embodiments are only a part of the embodiments of the disclosure, not all of them. Based on the embodiments of the disclosure, all other embodiments obtained by those skilled in the art without creative effort shall fall within the protection scope of the disclosure.

To make the above purposes, features, and advantages of the disclosure more obvious and understandable, the following will further describe the disclosure in detail with reference to the accompanying drawings and specific embodiments.

Embodiment 1

The embodiment of the disclosure provides a short-offset transient electromagnetic transmission system, which divides the 1 km long electrode distance into four short electrode distances using five sets of grounding electrodes, and uses eight twisted wires to connect the electrodes to four sets of isolated transmission power supplies, designing a bootstrap ultra-high voltage clamping technology to further accelerate the switching speed of the current.

Figure 1:
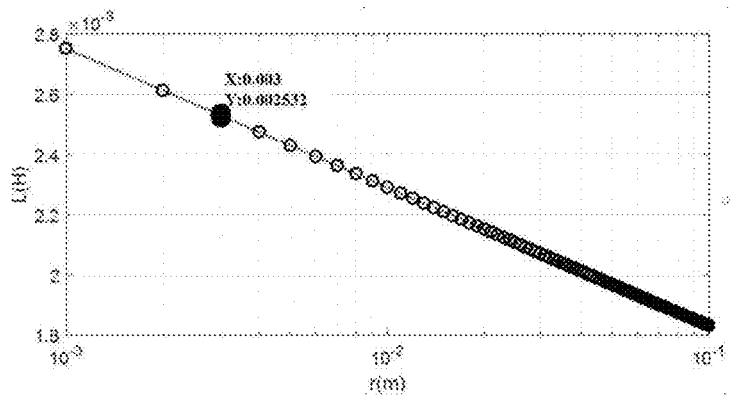
FIG. 1 illustrates a schematic diagram of a relationship between inductance of a 1 km wire and a wire radius.

For a 1 km long wire, if the mutual coupling relationship between the wires and the ground is ignored, the relationship between the wire inductance and the wire radius is as shown in FIG. 1.

Figure 2:
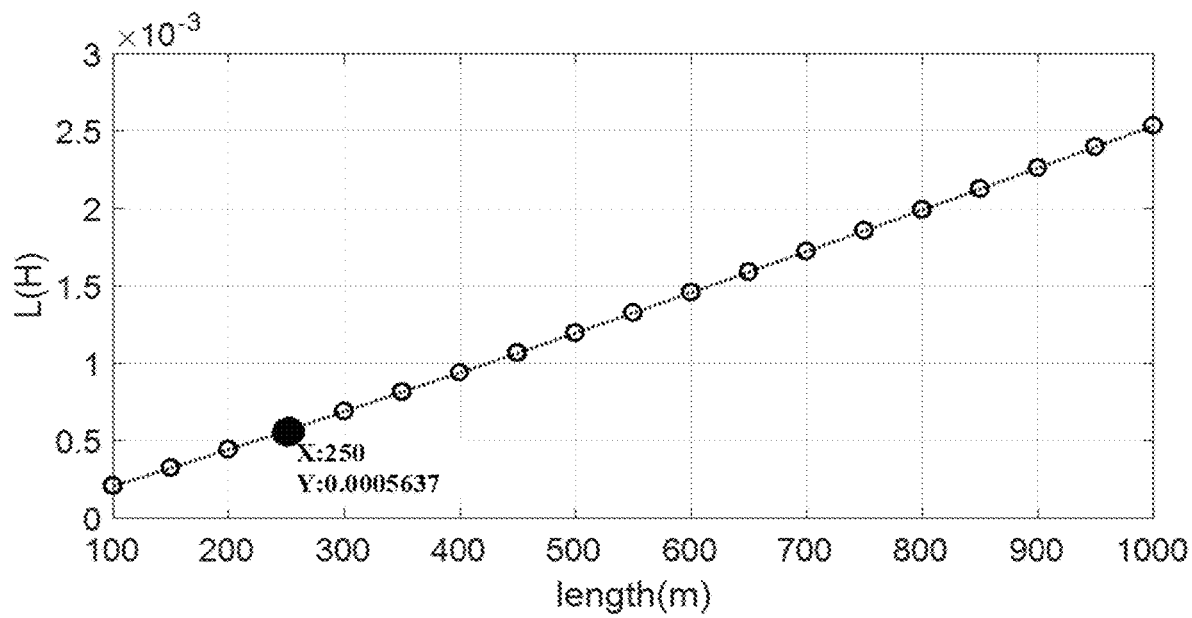
FIG. 2 illustrates a schematic diagram of a relationship between inductance and length of a wire with a radius of 3 millimeters (mm).

For a copper wire, with a current of 100 Amperes (A), the cross-sectional area is estimated to be 25 square millimeters ($mm^2$), the radius is about 3 mm, and the corresponding inductance is about 2.532 mH. Setting the wire radius to 3 mm, the relationship between the wire inductance and the wire length is as shown in FIG. 2.

The 1 km electrode distance is evenly divided into four parts by five electrodes, each part is 250 meters (m), and the corresponding inductance of the wire with a radius of 3 mm is 0.5637 mH.

Figure 3:
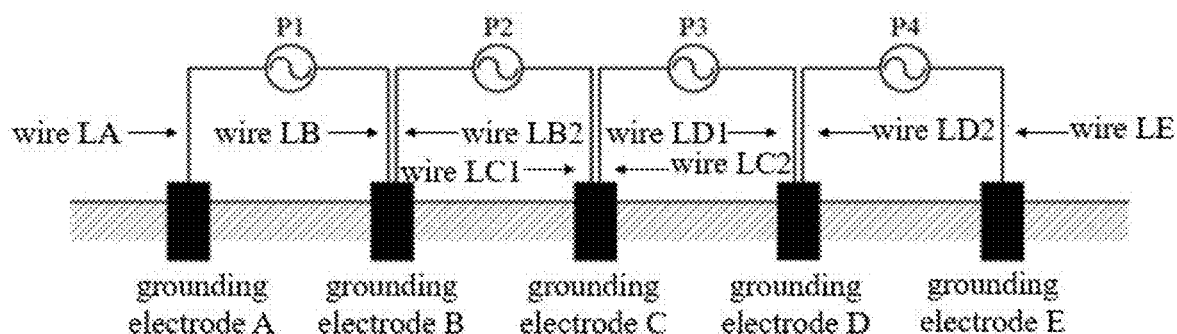
FIG. 3 illustrates a schematic structural diagram of a short-offset transient electromagnetic transmission system.

As shown in FIG. 3, the embodiment of the disclosure provides a short-offset transient electromagnetic transmission system, including: an electromagnetic transmitter with four transmission power supplies P1, P2, P3, P4, five sets of grounding electrodes A, B, C, D, F, and eight transmission wires LA, LB1, LB2, LC1, LC2, LD1, LD2, LE. The grounding electrode A and the grounding electrode B are connected to the transmission power supply P1 via the transmission wire LA and the transmission wire LB1. The grounding electrode B and the grounding electrode C are connected to the transmission power supply P2 via the transmission wire LB2 and the transmission wire LC1. The grounding electrode C and the grounding electrode D are connected to the transmission power supply P3 via the transmission wire LC2 and the transmission wire LD1. The grounding electrode D and the grounding electrode E are connected to the transmission power supply P4 via the transmission wire LD2 and the transmission wire LE. The transmission wire LA and the transmission wire LB1 are pulled from the electromagnetic transmitter to a position of the grounding electrode B in a twisted-pair manner, and the transmission wire LD2 and the transmission wire LE are pulled from the electromagnetic transmitter to a position of the grounding electrode D in the twisted-pair manner. For twisted wires with opposite currents, the surrounding magnetic fields cancel each other out, and the inductance can be ignored.

Since the transmission power supplies P1, P2, P3, P4 are isolated from each other, the issue of loop current leakage is therefore avoided. Assuming the inductance of the transmission wire is L and the grounding resistance is R, the current turn-off time is:

$$t_{\mathit{off}} = -\ln\left(\frac{1}{2}\right) \cdot \frac{L_{LOAD}}{R_{LOAD}} \approx 0.693 \cdot \frac{L_{LOAD}}{R_{LOAD}}. \tag{1}$$

It can be seen that the current turn-off time is only related to the grounding resistance and the wire inductance. Under the condition that the grounding resistance is determined, the inductance of 1 km long wire is divided into four small inductors with inductance of 0.5637 mH, and the turn-off time is reduced by about 78%.

Figure 4:
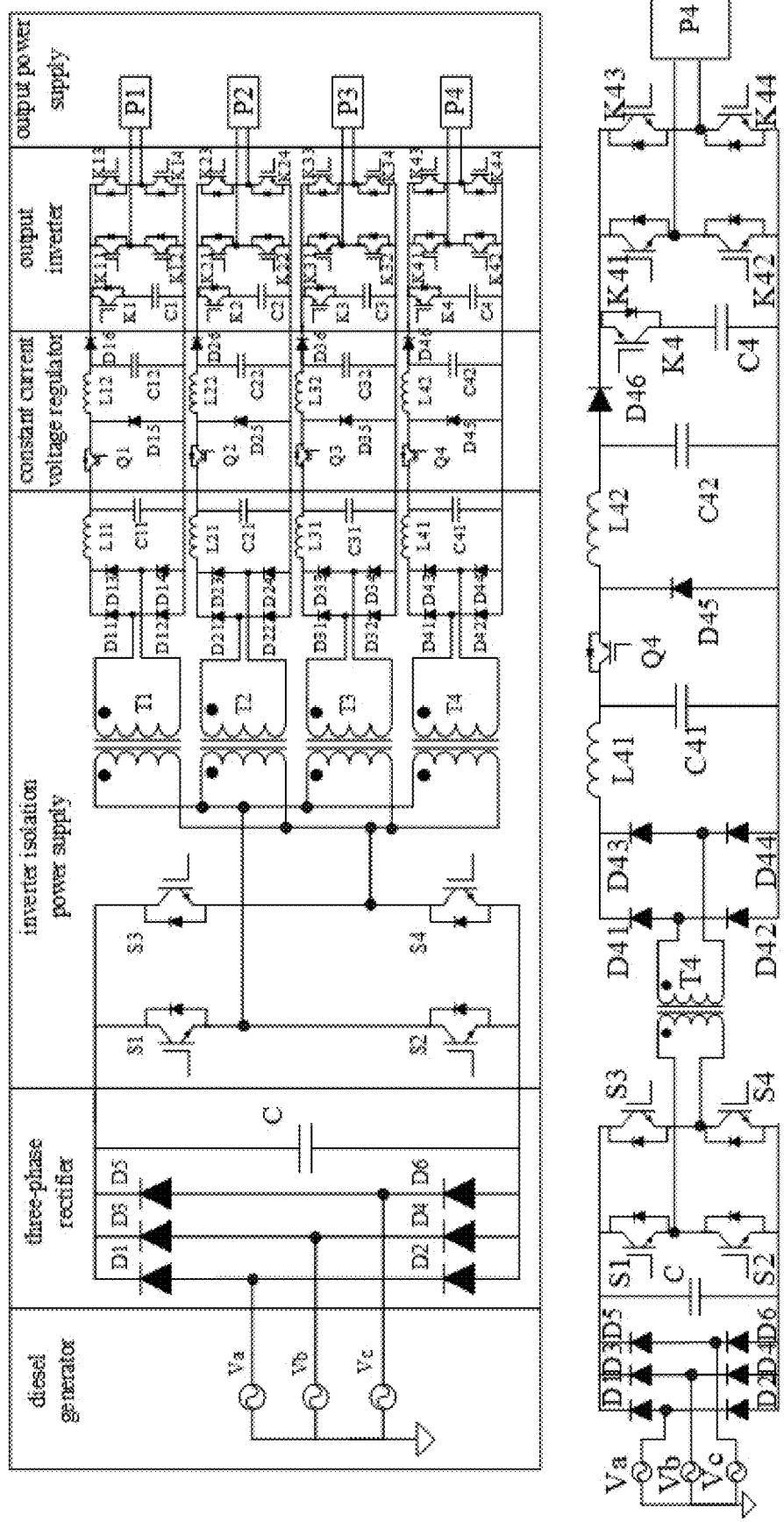
FIG. 4 illustrates a schematic structural diagram of an electromagnetic transmitter.

As an implementation of the embodiment of the disclosure, as shown in FIG. 4, the electromagnetic transmitter includes: a diesel generator, a three-phase rectifier, an inverter isolation power supply, a constant current voltage regulator, and an output inverter. The diesel generator is configured to provide 380 V three-phase alternating current. The three-phase rectifier is configured to convert the three-phase alternating current into 540 V direct current. The inverter isolation power supply is configured to acquire four sets of 1000 V isolated power supplies through an inverter bridge, four transformers, four high-frequency rectifier bridges, and an LC filter. The constant current voltage regulator is configured to control an output voltage to achieve constant current regulation. The output inverter is configured to generate the four output transmission power supplies P1, P2, P3, P4.

Further, the four transmission power supplies P1, P2, P3, P4 are relatively independent, and according to the output load, duty cycle signals are dynamically adjusted by controlling switching devices Q1-Q4 to maintain the output current constant.

The four transmission power supplies P1, P2, P3, P4 are completely consistent in structure. Here, the transmission power supply P4 is taken as an example to expand the connection relationship of the system, and other transmission power supplies are the same.

The diesel generator outputs three-phase electricity Va, Vb, and Vc (i.e., alternating current voltages Va, Vb, and Vc).

The three-phase rectifier utilizes the unidirectional conductivity of diodes to convert the three-phase alternating current voltages Va, Vb, and Vc into direct current. The three-phase rectifier consists of diodes D1-D6 and capacitor C. Specifically, the anode of the diode D1 is connected to the cathode of the diode D2 and connected to the generator Va; the anode of the diode D3 is connected to the cathode of the diode D4 and connected to the generator Vb; the anode of the diode D5 is connected to the cathode of the diode D6 and connected to the generator Vc; the cathodes of the diodes D1, D3, and D5 are connected and connected to one end of the non-polar capacitor C as the positive terminal of the three-phase rectifier power supply; the anodes of the diodes D2, D4, and D6 are connected and connected to the other end of the non-polar capacitor C as the negative terminal of the three-phase rectifier power supply.

The inverter isolation power supply uses the switching method of an H-bridge, which is composed of controlled power switching devices to make the output alternate between positive and negative, converting direct current into alternating current. An isolated alternating current is obtained through an isolation transformer, then a rectification bridge is used to convert the alternating current back into direct current with larger ripple. Finally, an LC filter is employed to achieve low-ripple direct current. The inverter isolation power supply includes insulated gate bipolar transistors (IGBT) S1-S4, transformer T4, fast recovery diodes D41-D44, inductor L41, and capacitor C41. Specifically, the collector of the transistor S1 is connected to the collector of the transistor S3 and connected to the positive terminal of the three-phase rectifier power supply at one end of the non-polar capacitor C. The emitter of the transistor S2 is connected to the emitter of the transistor S4 and connected to the negative terminal of the three-phase rectifier power supply at the other end of the non-polar capacitor C. The emitter of the transistor S1 is connected to the collector of the transistor S2 and connected to the primary same-polarity terminal of the transformer T4. The emitter of the transistor S3 is connected to the collector of the transistor S4 and connected to the primary opposite-polarity terminal of the transformer T4. The anode of the diode D41 is connected to the cathode of the diode D42 and connected to the secondary same-polarity terminal of transformer T4. The anode of the diode D43 is connected to the cathode of the diode D44 and connected to the secondary opposite-polarity terminal of transformer T4. The cathodes of the diode D41 and the diode D43 are connected and connected to one end of the inductor L41, and the other end of the inductor L41 is connected to one end of non-polar capacitor C41 as the positive terminal of the inverter isolation power supply; the anodes of the diode D42 and the diode D44 are connected and connected to the other end of the non-polar capacitor C41 as the negative terminal of the inverter isolation power supply.

The constant current voltage regulator is based on the principle of BUCK circuit, and the output voltage is proportional to the duty cycle of pulse-width modulation (PWM). The constant current voltage regulator is based on the PWM control method, and by adjusting the duty cycle, the purpose of constant current voltage regulation is achieved. The constant current voltage regulator includes IGBT Q4, diode D45, inductor L42, capacitor C42, and diode D46. The collector of the transistor Q4 is connected to the positive terminal of the inverter isolation power supply at one end of non-polar capacitor C41, the emitter of the transistor Q4 is connected to the cathode of the diode D45 and connected to one end of the inductor L42, the other end of the inductor L42 is connected to one end of non-polar capacitor C42 and connected to the anode of the diode D46, and the cathode of the diode D46 is the positive terminal of the constant current voltage regulation power supply. The other end of non-polar capacitor C42 is connected to the anode of the diode D45 and connected to the negative terminal of the inverter isolation power supply at the other end of capacitor C41 as the negative terminal of the constant current voltage regulation power supply.

The output inverter uses the switching method of the H-bridge composed of controlled power switching devices to make the output alternate between positive and negative, converting direct current into alternating current. The output inverter includes power switching device K4, capacitor C4, power switching device K41, power switching device K42, power switching device K43, and power switching device K44. The emitter of the power switching device K4 is connected to the collectors of the power switching devices K41 and K43, and to the cathode of the diode D46 of the constant current voltage regulation power supply. The collector of the power switching device K4 is connected to one end of the capacitor C4, and the other end of the capacitor C4 is connected to the emitters of the power switching devices K42 and K44, and to the anodes of the diodes D42, D44, and D45 of the constant current voltage regulation power supply. The emitter of the power switching device K41 and the collector of the power switching device K42 are connected as one terminal of output power supply P4 to the transmission electrode. The emitter of the power switching device K43 and the collector of the power switching device K44 are connected as the other terminal of output power supply P4 to another transmission electrode.

Figure 5:
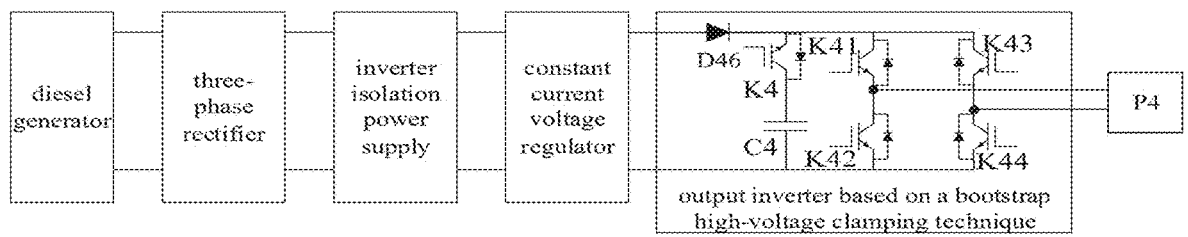
FIG. 5 illustrates a schematic structural diagram of an output inverter based on a bootstrap high-voltage clamping technique.

The typical transmission waveform for the SOTEM method is a 50% duty cycle bipolar square wave, observing the transient signal generated by the ground after the pulse is turned off. To achieve rapid switching of output current, the output inverter adopts bootstrap high-voltage clamping technique. The system connection relationship of power supply P4 is illustrated in FIG. 5 as an example, and other power supplies follow similarly.

Figure 6:
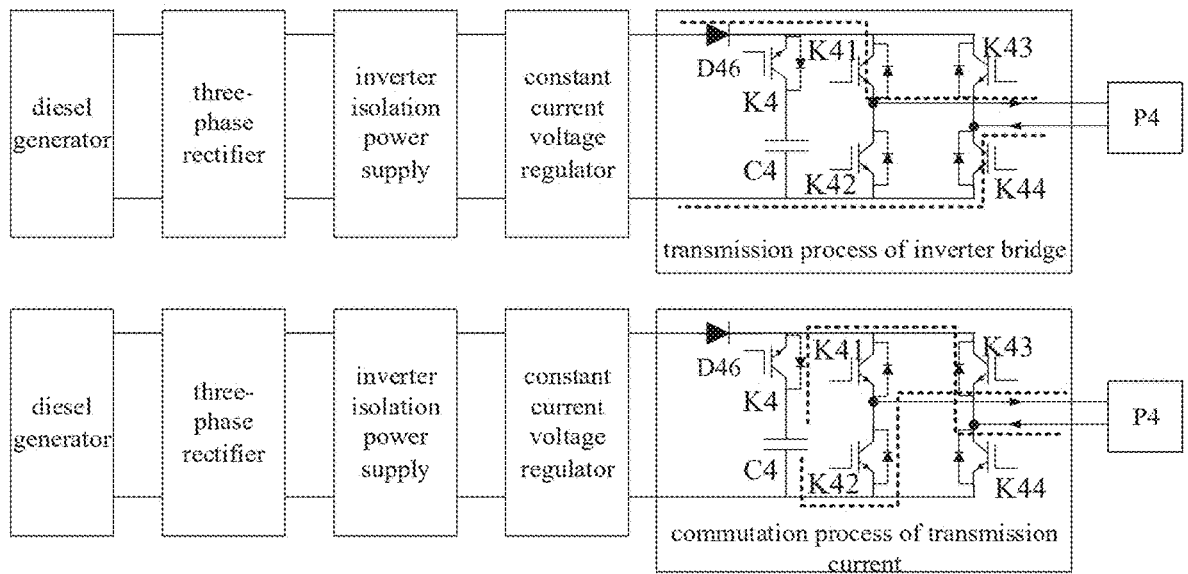
FIG. 6 illustrates a schematic diagram of a charging process of a bootstrap capacitor.

Due to the unidirectional conductivity of the diode D46, when the cathode voltage of the diode D46 is higher than the anode, the diode D46 is cut off; otherwise, it conducts. In the initial state, the voltage of bootstrap capacitor C4 is equal to the constant current voltage regulation output voltage. Since the power supply P4 is connected to the electrodes via long wires with significant inductance, after the inverter bridge turns off the transmission current, the reverse current through the wire inductance charges the capacitor C4. The charging process of the bootstrap capacitor C4 is shown in FIG. 6.

Figure 7:
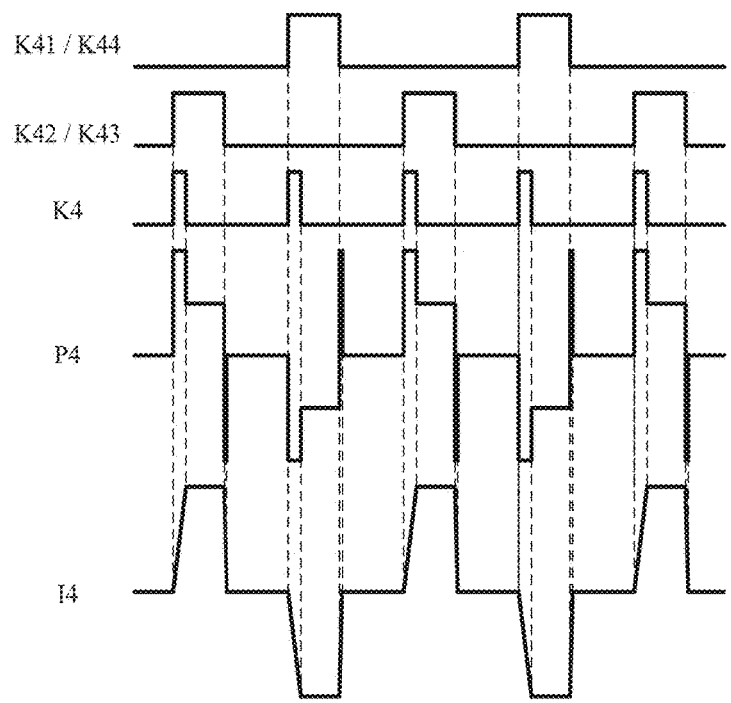
FIG. 7 illustrates a schematic diagram of the bootstrap high-voltage clamping control and output voltage and current waveforms.

To achieve rapid switching of current, the bootstrap capacitor C4 is first charged. When the charging voltage reaches a preset value, the control of power switching device K4 is activated, using the voltage on the bootstrap capacitor C4 to rapidly magnetize and demagnetize the inductive load of the output inverter. This enables the conversion of magnetic energy on the long wires and electrical energy on the capacitor, achieving high-bandwidth current change in the transmission. After the bootstrap capacitor C4 is fully charged, the switching control signals for the switching devices K41-K44 of the inverter bridge and the bootstrap switching device K4, and the transmission waveforms of the power supply P4 and transmission current 14, are shown in FIG. 7.

Figure 8:
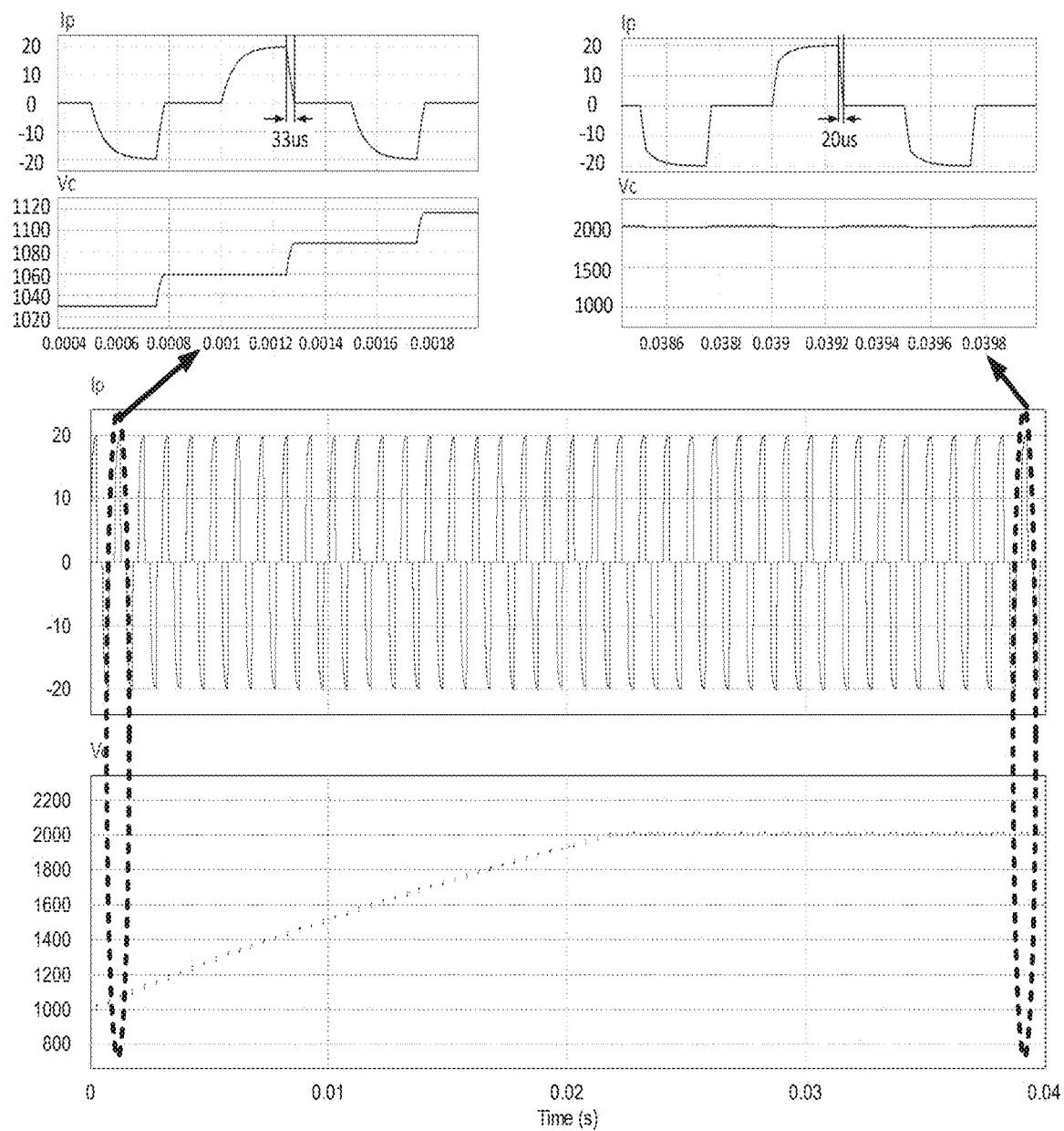
FIG. 8 illustrates a schematic diagram of simulation results based on the bootstrap high-voltage clamping technique.

Furthermore, a simulation model of the output inverter based on the bootstrap high-voltage clamping technique is constructed. The transmission voltage is set to 1000 V, with a 1 km long wire inductance of 2.5 mH, grounding resistance of 50 ohm ($\Omega$), and a 1 kHz output frequency with a 50% duty cycle bipolar square wave. When the voltage of the bootstrap capacitor reaches 2000 V, the normal control of the power switching device K4 is started. The control signal V1 and V2 from the output inverter bridge are "AND" operated, and then the result is "XOR" operated with its signal delayed by 30 microseconds ($\mu$s) to control the power switching device K4. The simulation results are shown FIG. 8.

It can be seen that, at the beginning of startup, the voltage of the bootstrap capacitor gradually rises until stabilizing at 2000 V, after which normal operation begins. During the rise of the capacitor voltage, the current turn-off time is approximately 33 $\mu$s. Once the bootstrap capacitor voltage reaches 2000 V, the power switching device K4 begins operating, at which point the current turn-off time is approximately 20 $\mu$s. The system has a significant effect of accelerating current switching.

The embodiments described above are only illustrative of the illustrated implementations of the disclosure and do not limit the scope of the disclosure. Under the inventive concept of the disclosure, any modifications or improvements made by those skilled in the art without creative effort shall fall within the protection scope defined by the claims of the disclosure.

What is claimed is:

1. A short-offset transient electromagnetic transmission system, comprising: an electromagnetic transmitter with four transmission power supplies P1, P2, P3, P4, five sets of grounding electrodes A, B, C, D, F, and eight transmission wires LA, LB1, LB2, LC1, LC2, LD1, LD2, LE;

wherein the grounding electrode A and the grounding electrode B are connected to the transmission power supply P1 via the transmission wire LA and the transmission wire LB1; the grounding electrode B and the grounding electrode C are connected to the transmission power supply P2 via the transmission wire LB2 and the transmission wire LC1; the grounding electrode C and the grounding electrode D are connected to the transmission power supply P3 via the transmission wire LC2 and the transmission wire LD1; the grounding electrode D and the grounding electrode E are connected to the transmission power supply P4 via the transmission wire LD2 and the transmission wire LE; the transmission wire LA and the transmission wire LB1 are pulled from the electromagnetic transmitter to a position of the grounding electrode B in a twisted-pair manner; and the transmission wire LD2 and the transmission wire LE are pulled from the electromagnetic transmitter to a position of the grounding electrode D in the twisted-pair manner;

wherein the electromagnetic transmitter comprises: a diesel generator, a three-phase rectifier, an inverter isolation power supply, a constant current voltage regulator, and an output inverter; the diesel generator is configured to provide 380 volts (V) three-phase alternating current; the three-phase rectifier is configured to convert the three-phase alternating current into 540 V direct current; the inverter isolation power supply is configured to acquire four sets of 1000 V isolated power supplies through an inverter bridge, four transformers, four rectifier bridges, and an inductor-capacitor (LC) filter; the constant current voltage regulator is configured to control an output voltage to achieve constant current regulation; the output inverter is configured to generate the four output transmission power supplies P1, P2, P3, P4;

wherein the output inverter adopts a bootstrap voltage clamping technique; and wherein the four transmission power supplies P1, P2, P3, P4 are independent, and according to an output load, duty cycle signals are dynamically adjusted by controlling switching devices Q1-Q4 to maintain an output current constant.

* * * * *